Oct. 14, 1924.
C. A. BODDIE
1,511,392
VOLTAGE REGULATOR SYSTEM
Filed May 23, 1919
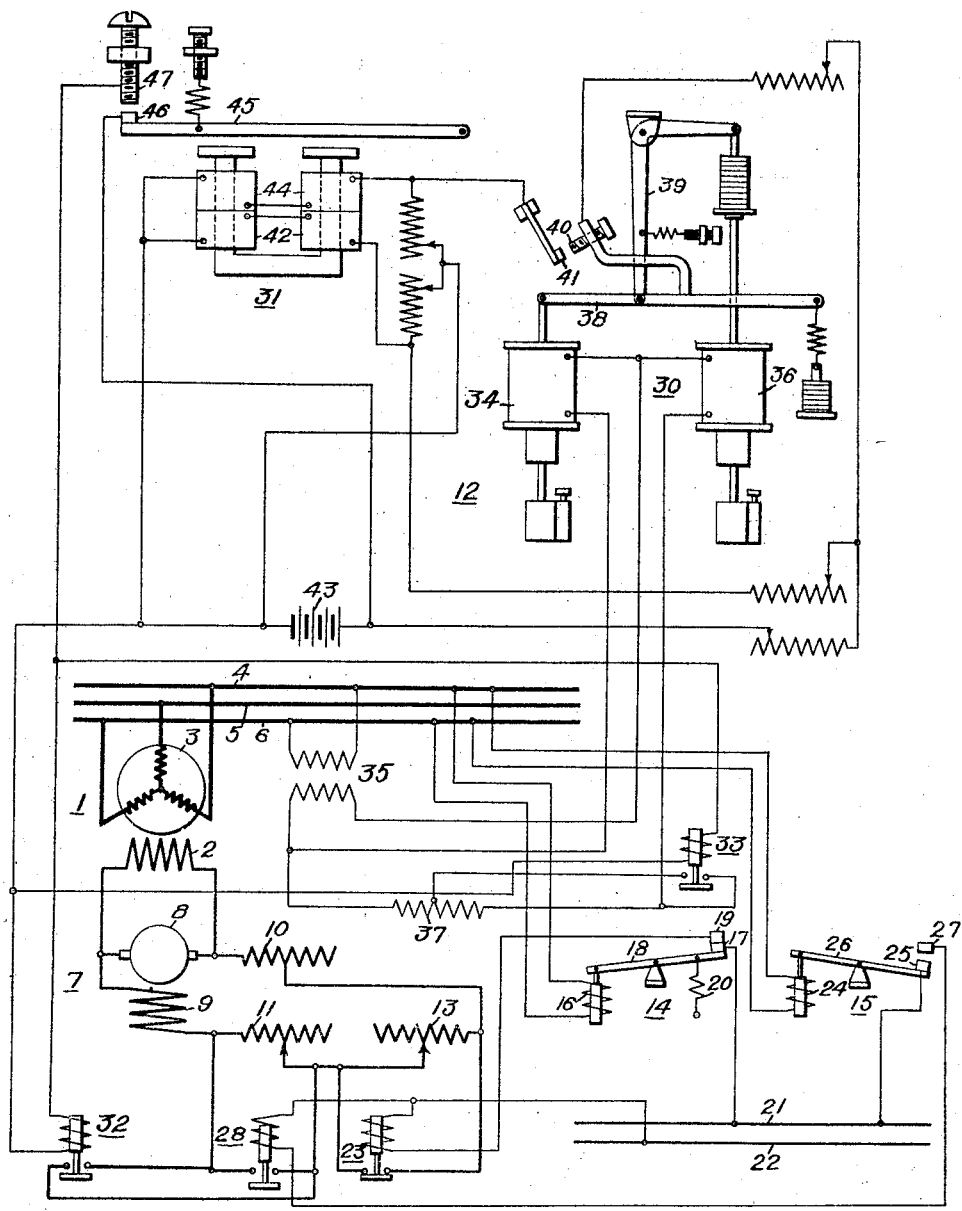
WITNESSES:
J. A. Helsel
W. B. Wells
INVENTOR
Clarence A. Boddie.
BY
Wesley G. Carr
ATTORNEY Patented Oct. 14, 1924.

1,511,392

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

VOLTAGE-REGULATOR SYSTEM.

Application filed May 23, 1919. Serial No. 299,176.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Voltage-Regulator Systems, of which the following is a specification.

My invention relates to voltage-regulator systems and particularly to regulator systems for governing the excitation of supply-circuit generators to maintain the voltage of the supply circuit substantially constant.

One object of my invention is to provide a regulator for governing the excitation of a supply-circuit generator and means for insuring the supply circuit against abnormally high or low voltage in case of failure of the regulator for any cause.

It is customary to provide the supply circuit with a voltage regulator for the main supply-circuit generator. The regulator is operated in accordance with the supply-circuit voltage to selectively short-circuit a resistor included in the exciter field-winding circuit. The exciting generator, in turn, varies the main-generator voltage to maintain the supply-circuit voltage substantially constant.

In case such regulator fails to operate, for any cause whatsoever, either the resistor in the exciter field-winding circuit is maintained in a short-circuited condition and, accordingly, produces an abnormally high voltage on the supply circuit or the complete resistor is inserted in the exciter field-winding circuit to produce an abnormally low voltage on the supply circuit.

In a regulator system constructed in accordance with my invention, means is provided for inserting an auxiliary resistor in the exciter field-winding circuit in case the regulator fails and maintains a short-circuit around the regulator resistance which is normally included in the exciter field-winding circuit. Moreover, means is provided for short-circuiting the regulator resistance, which is included in the exciter field-winding circuit, and for inserting the auxiliary resistor in the field-winding circuit in case the regulator fails, and maintains the complete regulator resistance in the exciter field-winding circuit. In either case, whether the failure of the regulator produces an abnormally high or low voltage on the supply circuit, the voltage of the supply circuit is returned to approximately normal value by excluding the regulator and the regulator resistance from the exciter field-winding circuit and inserting an auxiliary resistor in the exciter field-winding circuit. The auxiliary resistor, under normal conditions, produces approximately normal supply-circuit voltage.

The single figure of the accompanying drawing is a diagrammatic view of a regulator system embodying my invention.

Referring to the drawing, a generator 1, comprising a field winding 2 and an armature 3, is connected to a three-phase supply circuit embodying conductors 4, 5 and 6. The main-generator field windings 2 are energized by means of an exciter generator 7 comprising an armature 8 and a field winding 9. Included in the circuit of the field winding 9, is a standard voltage-limiting rheostat 10, a regulator resistor 11, which is controlled by a regulator 12, and an auxiliary resistor 13, which controls the exciter voltage in case of abnormal conditions upon the main supply circuit.

An over-voltage switch 14 is provided for inserting the auxiliary resistor 13 in the circuit of the field winding 9, in case of abnormally high voltage on the supply circuit, and an under-voltage switch 15 is provided for short-circuiting the resistor 11 and for inserting the auxiliary resistor 13 in the circuit of the field winding 9 in case of abnormally low voltage upon the main supply circuit. The over-voltage switch 14 embodies a winding 16 which is connected across the main supply conductors 4 and 6 and a contact member 17 which is mounted upon a contact arm 18. The contact member 17 is normally maintained in engagement with a co-operating contact member 19 by means of the winding 16 acting in opposition to a spring 20. The contact members 17 and 19 serve to complete a circuit from the supply conductors 21 and 22 through the winding of the relay 23. The relay 23 serves to maintain a short-circuit around the auxiliary resistor 13 when normal voltage is maintained upon the supply conductors 4, 5 and 6. In case of abnormally high voltage upon the supply conductors 4, 5 and 6, the over-voltage switch 14 is operated to disengage the contact members 17 and 19 and to release the relay 23 for inserting the auxiliary resistor 13 in the circuit of the field winding 9.

The under-voltage switch 15 embodies a winding 24 which is connected across the supply conductors 4 and 6 and a contact member 25 which is mounted upon a contact arm 26. The contact member 25, upon operation of the switch, engages a co-operating contact member 27 to connect the winding of a relay 28 across the supply conductors 21 and 22. The relay 28 serves to short-circuit the regulator resistor 11 in case of abnormally low voltage upon the supply conductors 4, 5 and 6.

The regulator 12, which intermittently short-circuits the resistor 11 to vary the excitation of the main generator 1 and maintain substantially constant voltage upon the supply circuit, embodies a main control element 30, a differential relay 31, which is controlled by the main control element 30, and two auxiliary relays 32 and 33. The main control element 30 comprises a main electromagnet 34 having a winding which is connected across the supply conductors 4 and 6 by means of a potential transformer 35, and a vibratory electromagnet 36 having a winding which is connected in circuit with an adjustable resistor 37 across the supply circuits 4 and 6 by means of the transformer 35. The main electromagnet 34 controls a contact arm 38 which is pivotally mounted upon a bell-crank lever 39. The bell-crank lever 39 is under the control of the vibratory electromagnet 36. A main contact member 40 is mounted upon the contact arm 38 and engages a co-operating contact member 41 to control the operation of the differential relay 31.

The differential relay 31 embodies windings 42, which are maintained in circuit with the battery 43 and windings 44, which are connected in circuit with the battery 43 upon engagement of the main contact members 40 and 41. The two sets of windings 42 and 44 are wound in opposition to each other and, when simultaneously energized, release a contact arm 45 to effect engagement between two contact members 46 and 47. Upon engagement of the contact members 46 and 47, the relay 32 is operated to short-circuit the resistor 11, and the relay 33 is operated to short-circuit a portion of the resistor 37, which is included in the winding circuit of the electromagnet 36.

The invention is not specific to the regulator shown, and, as the regulator is completely disclosed in a co-pending application by Allen A. Tirrill, Serial No. 254,760, filed Sept. 19, 1918, and assigned to the Westinghouse Electric & Manufacturing Co., it is deemed unnecessary to describe it in detail.

In brief, the regulator 12, under normal conditions, operates as follows: in case the voltage of the supply conductors 4, 5 and 6 falls slightly below normal value, then the main electromagnet 34 is operated to effect the engagement of the main contact members 40 and 41. Upon engagement of the main contact members 40 and 41, the differential relay 31 is operated to energize the relays 32 and 33. The relay 32 short-circuits the resistor 11 to increase the excitation of the main generator 1 and, accordingly, to increase the voltage on the supply conductors 4, 5 and 6. The relay 33 short-circuits a portion of the resistor 37 for increasing the energization of the vibratory electromagnet 36 to effect the disengagement of the main contact members 40 and 41 and, accordingly, to release the relay 32 and prevent further increase in the supply-circuit voltage. The above operation of the regulator 12, in short-circuiting the resistor 11, is effected at varying rates in accordance with the voltage obtaining upon the supply conductors 4, 5 and 6, a complete description of the operation of the regulator being found in the above-mentioned companion application.

In case the regulator 12 fails to operate, for any cause, and the contact members 40 and 41 are maintained in a disengaged position, it is apparent that the relay 32 is maintained de-energized, and the complete resistor 11 is maintained in the circuit of the field-magnet winding 9. The resistor 11 is of such value that, if maintained permanently in the field-magnet circuit, will produce abnormally low voltage on the supply conductors 4, 5 and 6. When the voltage of the supply circuit is reduced to a predetermined point below normal value, the under-voltage switch 15 is operated to effect engagement between the contact members 25 and 27. Upon engagement of the contact members 25 and 27, the relay 28 is operated to short-circuit the regulator resistor 11. The short-circuiting of the resistor 11 by the relay 28 will over-excite the main generator 1 and, accordingly, impress abnormally high voltage upon the supply conductors 4, 5 and 6. The increased voltage upon the supply conductors 4, 5 and 6 will operate the switch 14 to disconnect the contact members 17 and 19 and, accordingly, to release the relay 23 to insert the auxiliary resistor 13 in circuit with the field winding 9. The resistor 13 is of such value that the excitation of the main generator 1 will be maintained proper for normal load conditions and, accordingly, will maintain approximately normal voltage upon the supply conductors 4, 5 and 6.

In case the regulator 12 fails and the main contact members 40 and 41 are maintained in closed position, the relay 31 will be operated to energize the relay 32 and maintain a short-circuit around the resistor 11. The excitation of the main generator 1 is raised above normal value and, accordingly, abnormally high voltage is impressed upon the supply conductors 4, 5 and 6. The increased voltage upon the supply conductors effects operation of the over-voltage switch 14 for disengaging the contact members 17 and 19 to open the energizing circuit of the relay 23. The relay 23 inserts the resistor 13 in circuit with the field winding 9 to reduce the excitation of the generator 1 and, accordingly, to produce approximately normal voltage conditions upon the supply conductors 4, 5 and 6.

Thus, it is apparent that the supply conductors 4, 5 and 6 are protected from abnormally high or low voltage, such as would obtain in case the regulator should fail to operate, and permanently short-circuits the regulator resistor or permanently inserts the regulator resistor in the circuit of the exciter field windings.

Modifications in the system and arrangement and location of parts may be made within the spirit and scope of my invention, and such modifications are intended to be covered by the appended claims.

I claim as my invention:

1. In a regulator system, the combination with a supply circuit, of means comprising an exciter generator and a regulator for controlling the exciter generator to maintain the supply-circuit voltage substantially constant, resistance means in circuit with said exciter, and means adapted to selectively control the value thereof in the event of abnormal and subnormal voltage conditions on the supply circuit.

2. In a regulator system, the combination with a supply circuit, a main generator connected to the supply circuit, an auxiliary generator for exciting the main generator, and a regulator for controlling said auxiliary generator to maintain the supply-circuit voltage substantially constant, of auxiliary means controlled by supply circuit conditions for also governing the auxiliary generator in the event of an abnormally high and low voltage on the supply circuit in case of failure of said regulator.

3. In a voltage-regulator system, the combination with a supply circuit, a generator connected to the supply circuit, a source of current for exciting said generator, and a regulator for controlling said source of current to govern the excitation of the generator and to maintain the voltage of the supply circuit substantially constant, of a plurality of auxiliary means for controlling said source to prevent an abnormally high and an abnormally low voltage on the supply circuit in case of failure of the regulator.

4. In a voltage-regulator system, the combination with a supply circuit and a generator connected to the supply circuit, of a source of current for exciting said generator, means for regulating said source to govern the generator excitation and to maintain the supply-circuit voltage substantially constant, and independent auxiliary means responsive respectively to high voltage and low voltage for governing said source to prevent an abnormal voltage on the supply circuit in case of failure of said regulating means.

5. In a regulator system, the combination with a supply circuit, a generator connected to the supply circuit, and a source of current for exciting the main generator, of a resistor, a regulator for intermittently inserting said resistor in circuit with said source to govern the excitation of the generator and to maintain the voltage of the supply circuit substantially constant, a second resistor, means comprising a relay for inserting the second resistor in circuit with said source to govern the generator excitation in case of an abnormally high supply-circuit voltage, and means comprising a second relay for excluding said first resistor from the circuit of said source to govern the generator excitation in case of an abnormally low supply-circuit voltage.

6. In a regulator system, the combination with a supply circuit, a generator connected to the supply circuit, a source of current for exciting said generator, and a regulator of the vibratory type for controlling said source to govern the excitation of the generator and to maintain the supply-circuit voltage substantially constant, of a resistor, and means for excluding the regulator from control of said source and for controlling the value of said resistor in circuit with said source to maintain approximately normal supply-circuit voltage in case of a substantial variation from normal of the supply-circuit voltage.

7. In a regulator system, the combination with a supply circuit, a main generator connected to the supply circuit, an exciter generator for the main generator, a resistor connected in circuit with the exciter field winding, a regulator for selectively short-circuiting said resistor to maintain the supply-circuit voltage substantially constant, and a second resistor, of means controlled by the supply-circuit voltage for inserting said second resistor in circuit with the exciter field winding in case the regulator fails to operate while maintaining a short-circuit around the first-mentioned resistor, and means for also excluding the first-mentioned resistor from circuit in case the regulator fails to operate.

8. In a regulator system, the combination with a supply circuit, a resistor connected thereto, and a source of current therefor, of means comprising a regulator co-operating with said source and adapted to maintain substantially constant supply-circuit conditions, and means also co-operating with said source of current adapted to control the value of said resistor in the event of abnormal or subnormal supply-circuit conditions.

9. In a regulator system, the combination with a supply circuit, a generator connected thereto, an exciter for said generator, and regulator means for maintaining a substantially constant supply circuit voltage comprising resistance means and control means therefor operated in accordance with the voltage of said supply circuit, of additional means adapted to selectively control the value of said resistance means in the event of a substantial variation from normal of the supply circuit voltages.

In testimony whereof, I have hereunto subscribed my name this 20th day of May, 1919.

CLARENCE A. BODDIE.